United States Patent
Toillon et al.

(10) Patent No.: US 9,692,460 B2
(45) Date of Patent: Jun. 27, 2017

(54) AVIONIC INFORMATION TRANSMISSION SYSTEM

(71) Applicant: THALES, Courbevoie (FR)

(72) Inventors: Patrice Georges Paul Toillon, Velizy Villacoublay (FR); Paul Marie Boivin-Champeaux, Velizy Villacoublay (FR); Vincent Christophe Cédric Sollier, Velizy Villacoublay (FR); David José Faura, Velizy Villacoublay (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/963,823

(22) Filed: Dec. 9, 2015

(65) Prior Publication Data

US 2016/0173139 A1    Jun. 16, 2016

(30) Foreign Application Priority Data

Dec. 10, 2014    (FR) ...................................... 14 02809

(51) Int. Cl.
| | |
|---|---|
| *H04L 7/00* | (2006.01) |
| *H04B 1/04* | (2006.01) |
| *H04L 12/26* | (2006.01) |
| *H04L 29/08* | (2006.01) |

(52) U.S. Cl.
CPC ........... *H04B 1/04* (2013.01); *H04L 43/0852* (2013.01); *H04L 67/12* (2013.01)

(58) Field of Classification Search
CPC ......... G06F 1/10; H04J 3/0685; H04J 3/0688; H04J 3/0638; H04J 3/0608; H04L 7/0008; H04L 7/0083; H04L 7/033; H03L 7/143

USPC ................................................... 375/354–376
See application file for complete search history.

(56) References Cited

U.S. PATENT DOCUMENTS

| | | | | |
|---|---|---|---|---|
| 8,669,783 | B2* | 3/2014 | Canu | H03K 19/017581 326/27 |
| 8,675,689 | B2* | 3/2014 | Bobrek | H04J 3/0641 370/509 |
| 9,001,849 | B2* | 4/2015 | Bobrek | H04J 3/0641 370/503 |
| 9,063,837 | B2* | 6/2015 | Bauer | G06F 1/14 |
| 9,071,515 | B2* | 6/2015 | Fumey | H04L 43/08 |
| 2007/0230429 | A1* | 10/2007 | Sannino | H04L 12/40019 370/342 |

(Continued)

FOREIGN PATENT DOCUMENTS

| | | |
|---|---|---|
| EP | 2490357 A2 | 8/2012 |
| WO | 2009/011087 A2 | 1/2009 |

OTHER PUBLICATIONS

French Search Report dated Jul. 21, 2015 issued in corresponding French Patent Application No. 1402809.

*Primary Examiner* — James M Perez
(74) *Attorney, Agent, or Firm* — Troutman Sanders LLP

(57) ABSTRACT

This system for transmitting avionic information of the type including means for transmitting data frames through at least one transmission network based on avionic switches, intended for corresponding receiving means. The system further includes means for determining the crossing time by at least some of the data frames of at least some of the switches and means on the network for transmitting a corresponding crossing time information frame associated with this data frame, intended for corresponding receiving means.

10 Claims, 2 Drawing Sheets

(56) References Cited

U.S. PATENT DOCUMENTS

| | | | |
|---|---|---|---|
| 2009/0028227 A1* | 1/2009 | Nouis | H04L 1/24 375/224 |
| 2009/0183038 A1* | 7/2009 | Andreoletti | H04L 1/20 714/708 |
| 2010/0110908 A1* | 5/2010 | Guichard | H04L 12/2697 370/252 |
| 2011/0292842 A1* | 12/2011 | Danet | G06F 13/385 370/276 |
| 2012/0008697 A1* | 1/2012 | Emonide | H04L 12/40006 375/259 |
| 2012/0032030 A1* | 2/2012 | Ruckes | B64C 13/16 244/215 |
| 2012/0134428 A1* | 5/2012 | Bobrek | H04B 3/00 375/258 |
| 2012/0207183 A1* | 8/2012 | Bobrek | H04J 3/0641 370/511 |
| 2012/0280327 A1* | 11/2012 | Canu | H03K 19/01758 257/369 |
| 2013/0086432 A1* | 4/2013 | Bauer | G06F 1/14 714/47.3 |
| 2013/0163456 A1* | 6/2013 | Fumey | H04L 43/08 370/252 |
| 2014/0269781 A1* | 9/2014 | Bobrek | H04J 3/0641 370/511 |
| 2015/0003286 A1* | 1/2015 | Toillon | H04L 41/12 370/254 |
| 2015/0016259 A1* | 1/2015 | Toillon | H04L 12/437 370/235 |
| 2015/0043360 A1* | 2/2015 | Poledna | H04L 43/026 370/250 |
| 2015/0161403 A1* | 6/2015 | Toillon | H04L 9/3236 726/30 |
| 2015/0370572 A1* | 12/2015 | Toillon | G06F 9/52 712/214 |
| 2016/0056905 A1* | 2/2016 | Hartlmueller | H04L 12/40032 375/354 |
| 2016/0142480 A1* | 5/2016 | Toillon | H04L 67/1095 709/248 |
| 2016/0173472 A1* | 6/2016 | Toillon | H04L 63/08 726/5 |
| 2016/0218930 A1* | 7/2016 | Toillon | H04L 5/14 |
| 2016/0246980 A1* | 8/2016 | Toillon | G06F 21/62 |
| 2016/0347267 A1* | 12/2016 | Toillon | H04L 1/0061 |

* cited by examiner

AVIONIC INFORMATION TRANSMISSION SYSTEM

CROSS-REFERENCE TO RELATED APPLICATION

The present application claims priority to French Application No. 1402809, filed Dec. 10, 2014. This application is incorporated herein by reference in its entirety.

FIELD OF THE INVENTION

The present invention relates to a system for transmitting avionic information.

More particularly, the invention relates to such a system which includes means for transmitting data frames through at least one avionic transmission network based on switches, intended for corresponding receiving means.

The invention is therefore placed in the context of avionic systems and in particular communication networks for this type of applications.

BACKGROUND OF THE INVENTION

Communication networks presently retained in the avionic field are based on the ARINC 664 standard.

These communication systems rely on intermediate communication equipment (also called «intermediate system» or IS) of the switch type as well as on end interfaces (also called «end system» or ES) localized in each of the pieces of equipment subscribed to the network.

Presently it appears that an application data is transmitted through a same piece of equipment on two distinct sub-networks A and B, intended for one or several pieces of receiving equipment.

Thus the application datum is encapsulated and then duplicated by the transmitter so as to be transmitted over both sub-networks.

A sequence number (or SN) is inserted into the frames.

One of the goals of this SN is to identify both frames, one of the network A and the other of the network B, derived from the same occurrence.

Both sub-networks A and B do not have any piece of physical equipment in common or any common physical link.

Thus both flows of data take physically segregated paths.

Each logical flow is identified by a virtual link in which the physical frames pass in transit.

At the piece of receiving equipment, the ARINC 664 standard allows various configurations of the ES:

Configuration 1: only one of two frames bearing the same SN is provided to the application interface. The frame transmitted up to the application interface is the entire frame which arrives first.

Configuration 2: both frames are provided to the application interface.

The presence of redundancy A/B inter alia gives the possibility of guaranteeing the integrity of delay, i.e. the frame provided to the application interface is not too «old» at acceptable levels, these levels being set by the system requirements.

Indeed, according to the criticality of the application data, the certification authorities require observance of different security constraints.

Thus for application data relative to critical airplane functions, the security constraints are the most restrictive and should notably observe a qualitative principle, no simple failure should lead to a catastrophic event for the airplane.

Physical segregation of the paths A and B ensures that a simple failure at the network cannot have the consequence of the transmission of a too old frame to the piece of receiving equipment.

Indeed, if the simple failure occurs on the path of the network A, the frame from the network B will not have been subject to this failure.

In order that the delay integrity be not guaranteed, a second failure would then have to take place on the path of the network B.

SUMMARY OF THE INVENTION

The object of the invention is to propose improvements to such transmission systems.

For this purpose, the object of the invention is a system for transmitting avionic information of the type including means for transmitting data frames through at least one transmission network based on avionic switches, intended for corresponding receiving means, characterized in that it includes means for determining the crossing time by at least some of the data frames of at least some of the switches and means for transmitting an information frame on the network with a corresponding crossing time associated with this data frame, intended for the corresponding receiving means.

According to other features of the system according to the invention taken alone or as a combination:

the determination means are adapted in order to determine the crossing time for all the data frames circulating in the network;

the determination means are adapted in order to determine the crossing time for all the switches of the network;

the means for determining the crossing time comprise means for determining the switch entry instant and the switch exit instant of the frame and means for calculating the crossing time from these instants;

the determination means are connected to means for generating the information frame with the crossing time, to be transmitted;

the determination means are connected to means for selecting the information frame with the crossing time to be transmitted in a pre-established table of frames;

the crossing time information is the actual crossing time;

the crossing time information is a piece of image information of this actual crossing time;

several crossing time information frames are associated with a data frame and correspond to the crossing times by the frame of several switches of the network between the transmission means and the receiving means;

a crossing time information frame is associated with a data frame and includes several pieces of crossing time information by the frame of several switches of the network between the transmission means and the receiving means.

BRIEF DESCRIPTION OF THE DRAWINGS

The invention will be better understood by means of the description which follows, only given as an example and made with reference to the appended drawings, wherein.

DETAILED DESCRIPTION OF THE INVENTION

Figure 1:
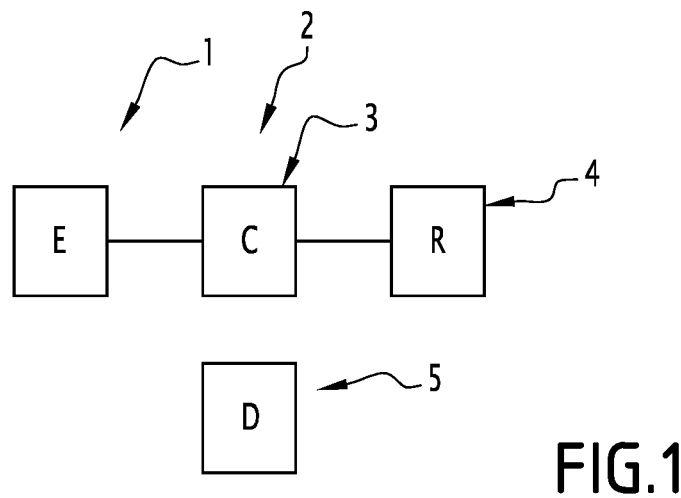
FIG. 1 schematically illustrates a system for transmitting avionic information.

In FIG. 1, an exemplary embodiment of a system for transmitting avionic information is actually illustrated.

The latter includes means for transmitting data frames designated by the general reference 1, through at least one transmission network, designated by the general reference 2, based on avionic switches designated by the general reference 3, intended for corresponding receiving means designated by the general reference 4.

The data frames are for example designated by the general reference 5 in this FIG. 1 for one of them.

This frame is therefore transmitted by the transmission means 1, intended for the receiving means 4, through the network 2, and in particular the switch 3 of this network.

According to the invention, in the transmission system according to the invention, crossing time determination means are provided by at least some of the data frames of at least some of the switches of the network.

Transmission means are also provided on the network, for at least one corresponding crossing time information frame, associated with this data frame, intended for corresponding receiving means.

Figure 2:
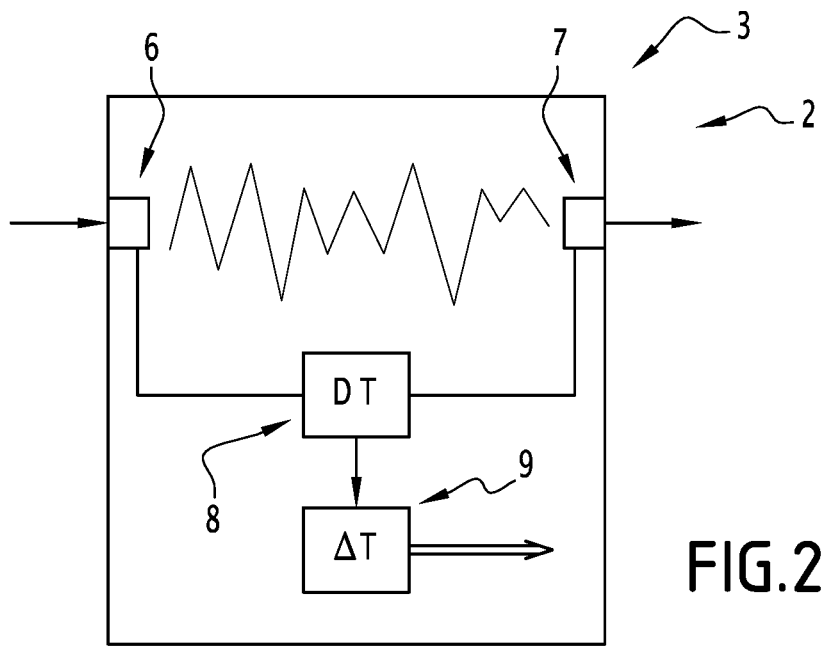
FIG. 2 illustrates an exemplary embodiment of means for generating a crossing time information frame entering the structure of the system according to the invention.
Figure 3:
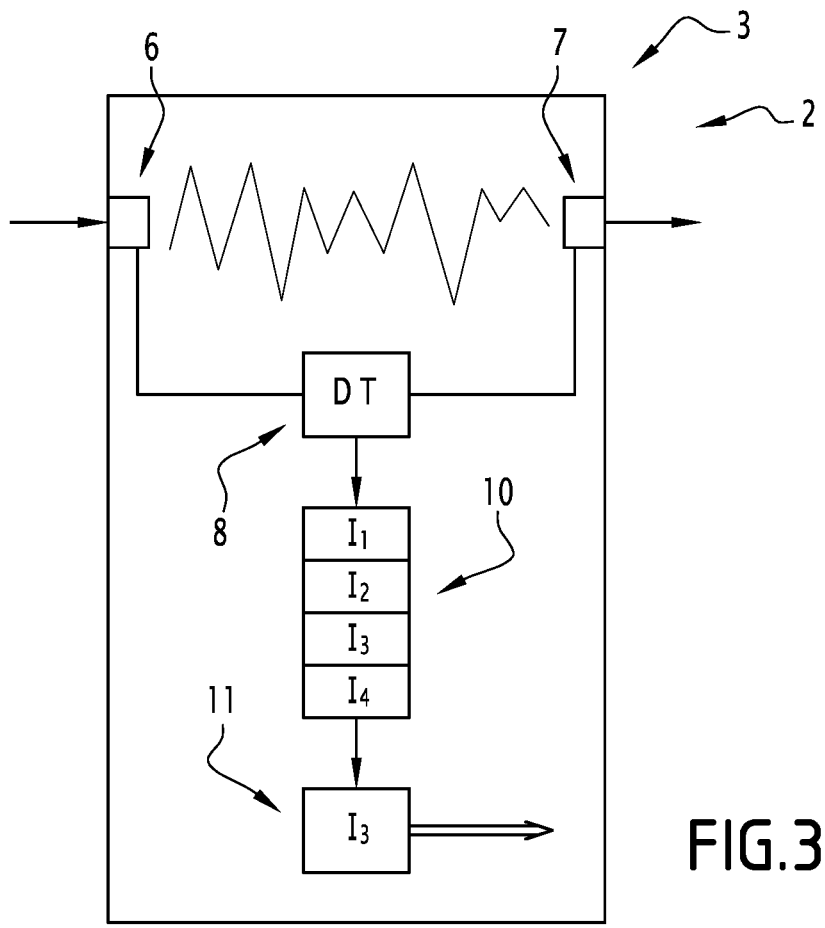
FIG. 3 illustrates an alternative embodiment of these frame generation means.

This is for example illustrated in FIGS. 2 and 3 which illustrate two exemplary embodiments of means giving the possibility of producing a crossing time information frame.

In FIG. 2, the data transmission network 2 and the switch 3 of the latter are recognized.

The means for determining the crossing time then comprise means for determining the data frame entry instant and the data frame exit instant of the switch 3 and means for calculating the crossing time from these entry and exit instants.

The determination means are designated by references 6 and 7 respectively, while the means for calculating the crossing time are designated by the general reference 8.

In the exemplary embodiment illustrated in FIG. 2, the determination means also comprise means for generating the crossing time information frame to be transmitted, designated by the general reference 9 in this Figure.

This is achieved for example by integrating the crossing time in a frame structure.

As this is illustrated in this Figure, the crossing time information may then be formed by the actual crossing time as calculated as described earlier.

Of course other embodiments may be contemplated like the one for example illustrated in FIG. 3.

Indeed in this FIG. 3, the data transmission network 2, the network switch 3, the means for determining the entry and exit instants 6 and 7 respectively and the means for calculating the crossing time 8 are recognized.

In the exemplary embodiment described in this Figure, the determination means are connected to means for selecting the crossing time information frame to be transmitted over the network, in a pre-established table of frames, as illustrated and designated for example by the general reference 10 in this FIG. 3.

This for example gives the possibility of avoiding a frame generation resource including a resource for generating a control word (CRC) and for example allows transmission of the crossing time frame immediately after the data frame.

Means for storing a table of pre-established crossing time information frames are actually seen on this figure and which may then be selected so as to be transmitted.

The determination means described earlier actually allow in this exemplary embodiment, selection of the corresponding information frame to be transmitted over the network.

Such a selected frame is designated by the general reference 11 in this FIG. 3.

Also, the crossing time information may be a piece of image information of this actual crossing time and not directly the crossing time calculated as explained earlier.

It is then conceivable that such a structure may be applied in different ways, the determination means being adapted for determining the crossing time for all the data frames circulating over the network or for only some of them and for determining the crossing time for all the switches of the network or only some of these switches.

Figure 4:
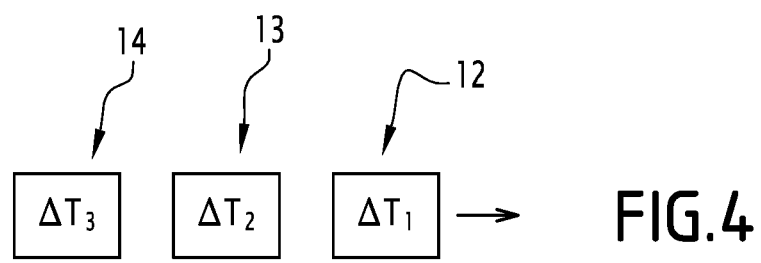
FIGS. 4 and 5 illustrate two possible embodiments of this type of crossing time information frames.

For this purpose and as this is illustrated in FIG. 4, it is then possible to have several crossing time information frames associated with a data frame.

Each frame then corresponds to the frame's crossing time of a switch of the network between the transmission means and the receiving means.

If the frame crosses several switches, one then has a succession of crossing time information frames.

For example this is illustrated in FIG. 4 where several successive crossing time information frames designated by the references 12, 13 and 14 are seen.

Each frame therefore corresponds to the crossing time by the data frame of one of the switches of the network.

Figure 5:
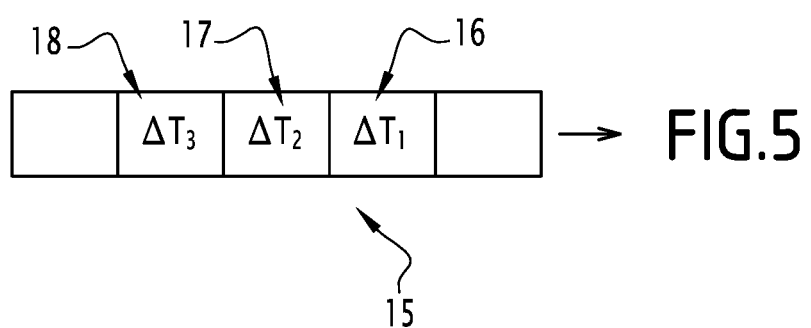

In FIG. 5, a single crossing time information frame on the contrary is illustrated.

This crossing time information frame is designated by the general reference 15.

This crossing time information frame is associated with a data frame and includes several pieces of the frame's crossing time information of several switches of the network, between the transmission means and the receiving means.

These pieces of crossing time information are respectively designated by the references 16, 17 and 18.

Thus the invention proposes a mechanism for measuring the crossing time by a data frame, of an avionic switch and which has the purpose of determining and broadcasting this time or a piece of information representative of this time, via the information transmission network so that the piece of receiving equipment may determine the ageing of the latter during its propagation through the network.

The redundancy A/B described earlier is therefore no longer necessary for guaranteeing the integrity of the delay.

Such a structure has a certain number of advantages notably by the fact that it is non-intrusive.

Actually there is no time perturbation of the data flow and no frame modification.

Indeed, such a structure avoids real time modification, in the avionic switch, of the data frame, as this is the case in the state of the art.

This structure allows greater accuracy of the real measurement.

Finally, it does not require addition of a control word generator (CRC) and it is configurable.

Practically, the different elements which have just been described and notably the means for determining the crossing time, the measurement, calculation, selection means . . . may be integrated into the same hardware component and in particular in the described example, into the switch, the latter further allowing the crossing time information frame, to access the network.

Of course, other embodiments may further be contemplated.

In the meaning of the present invention, the transmission means, the determination means, the network means, the generating means, the selection means and any other means relate per example to computer programs or to any other physical units configured to implement the corresponding functions according methods known in the art.

The invention claimed is:

1. A system for transmitting avionic information comprising:
    transmitter transmitting data frames through at least one transmission network based on avionic switches, intended for corresponding receivers;
    a determiner able to determine a crossing time by at least some of the data frames of at least some of the switches; and
    a network transmitter able to transmit in the network a corresponding crossing time information frame associated with this data frame to the corresponding receiver.

2. The system for transmitting avionic information according to claim 1, wherein the determiner is adapted for determining the crossing time for all the data frames circulating in the network.

3. The system for transmitting avionic information according to claim 1, wherein the determiner is adapted for determining the crossing time for all the switches of the network.

4. The system for transmitting avionic information according to claim 1, wherein the determiner is able to determine the frame's entry instant and the frame's exit instant of the switch and is able to calculate the crossing time from these instants.

5. The system for transmitting avionic information according to claim 4, wherein the determiner is connected to a generator able to generate the crossing time information frame to be transmitted.

6. The system for transmitting avionic information according to claim 4, wherein the determiner is connected to a selector able to select the information frame with the crossing time to be transmitted in a pre-established table of frames.

7. The system for transmitting avionic information according to claim 1, wherein the crossing time information is the actual crossing time.

8. The system for transmitting avionic information according to claim 1, wherein the crossing time information is a piece of image information of this actual crossing time.

9. The system for transmitting avionic information according to claim 1, wherein several crossing time information frames are associated with a data frame and correspond to the crossing times by the frame of several switches of the network between the transmitter and the receiver.

10. The system for transmitting avionic information according to claim 1, wherein a crossing time information frame is associated with a data frame and include several pieces of crossing time information by the frame of several switches of the network between the transmitter and the receiver.

* * * * *